May 4, 1943.  P. E. MERCIER  2,318,006
LABYRINTH JOINT OR COUPLING
Filed Dec. 24, 1941  2 Sheets-Sheet 1
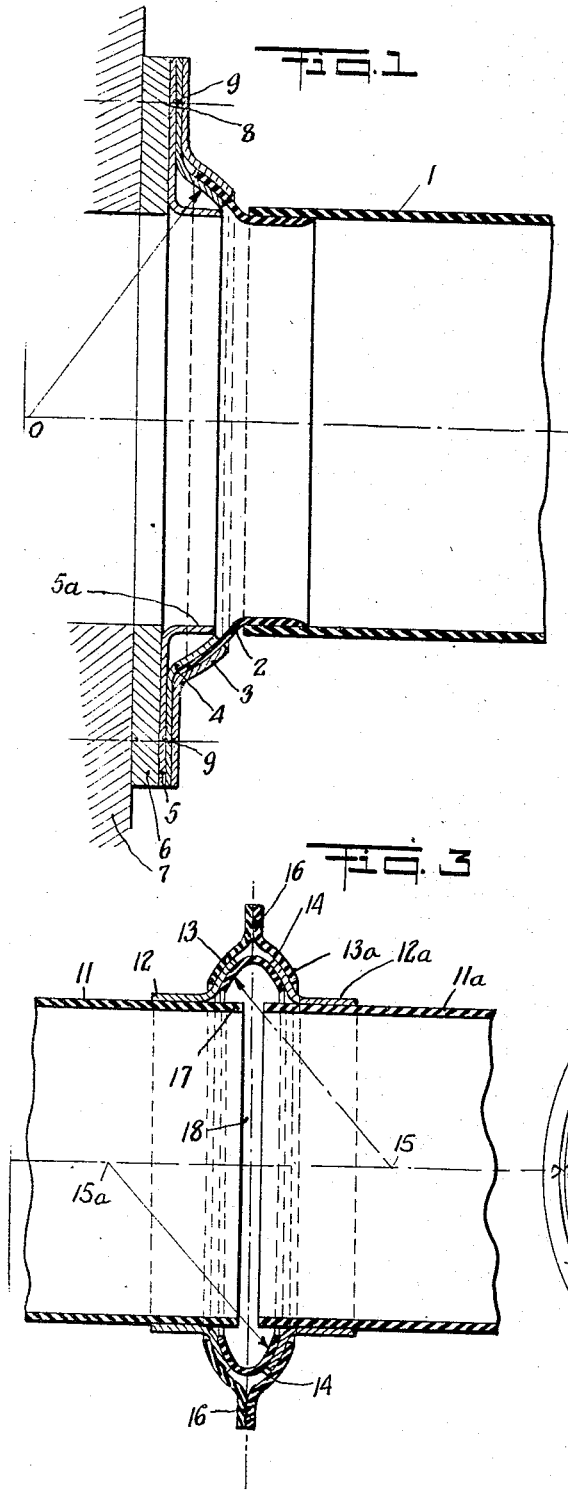
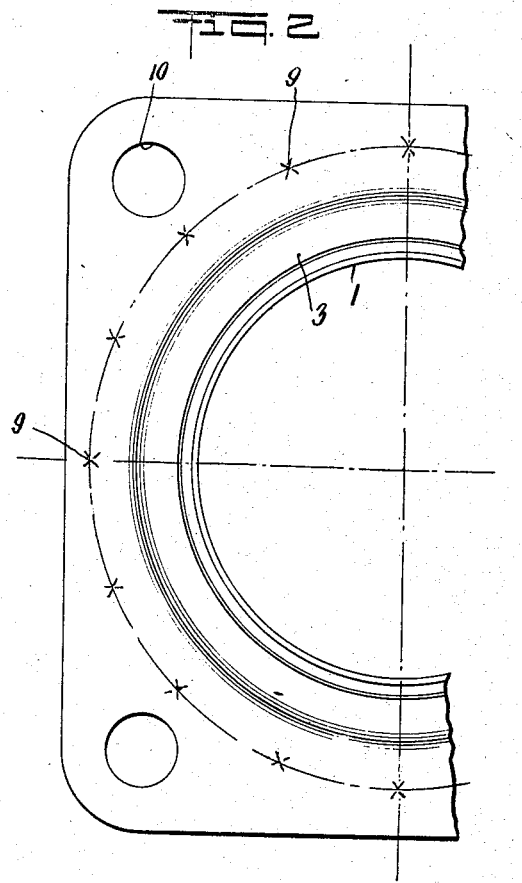
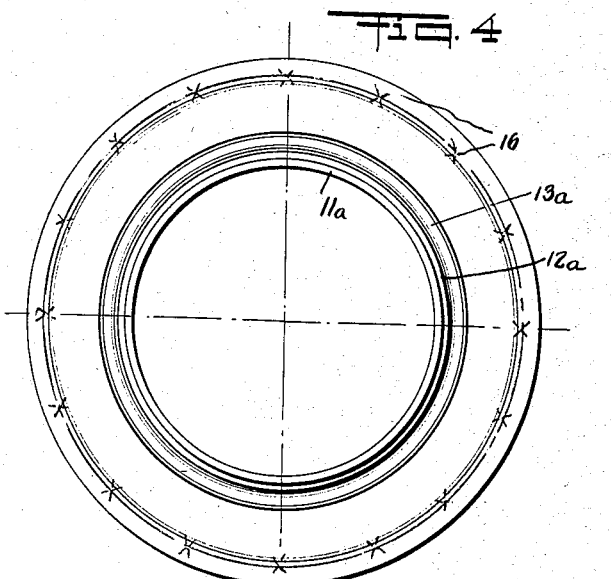
INVENTOR:
PIERRE ERNEST MERCIER
BY
Haseltine, Lake & Co.
ATTORNEYS.

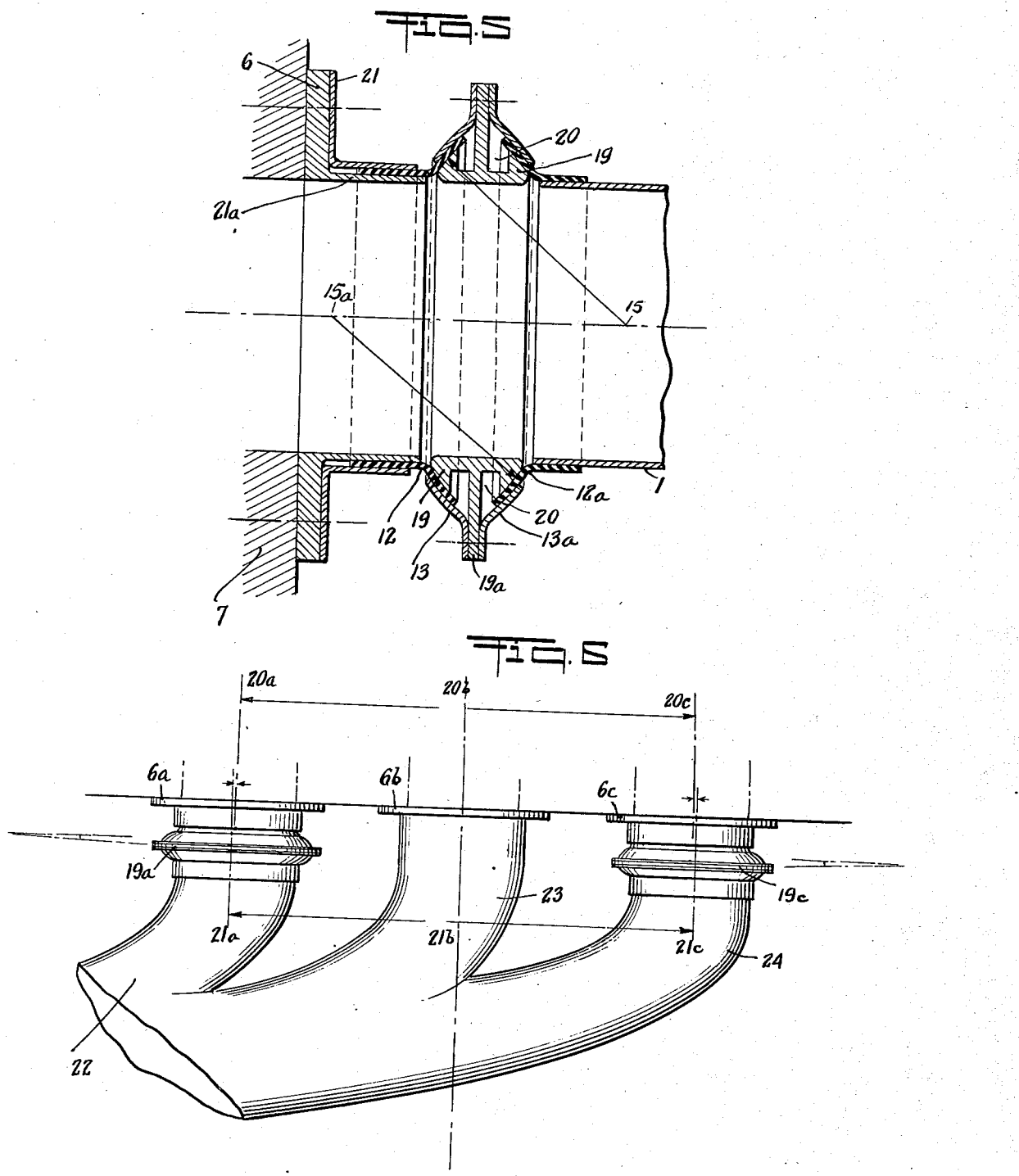

Patented May 4, 1943

2,318,006

UNITED STATES PATENT OFFICE 2,318,006

LABYRINTH JOINT OR COUPLING

Pierre Ernest Mercier, Westport, Conn.

Application December 24, 1941, Serial No. 424,219

6 Claims. (Cl. 285—90)

This invention relates to a labyrinth joint or coupling for employment, for example, in connecting a pipe to another member, for instance, to an exhaust manifold, or in connecting two pipes together.

In pipes carrying fluid at a high temperature, and particularly in exhaust pipes, joint assemblies must be introduced at certain points which permit slight angular or linear displacements rendered necessary by the effects of expansion and vibrations. Such assemblies must take up little space and be at the same time sufficiently tight.

It is an object of this present invention to provide a joint assembly which shall possess these properties.

It is a further object of this invention to provide a joint assembly which shall permit angular movement and/or longitudinal movement in response to vibrations and thermal changes while at the same time preventing leakage of fluid at said joint.

Other objects and advantages of the present invention will appear from the following description and be pointed out in the appended claims.

The invention is illustrated by way of example only in the accompanying drawings in which:

Figure 1 shows an application of the invention in coupling a pipe to a flange adapted to be bolted to a mounting plate.

Figure 2 is a half-end view of Figure 1.

Figure 3 is an example of the application of the invention to an intermediate joint.

Figure 4 is an end view of the joint shown in Figure 3.

Figure 5 shows an embodiment of the invention applied in coupling a pipe to a flange in such manner as to permit a sliding motion between elements of the joint along the axis of the opening to which the pipe is connected, and Figure 6 is an embodiment of the invention applied to a manifold with three branches.

The joints to which the present invention relates satisfy the following conditions: They are characterized by the employment of a collar integral with the end of the pipe to be connected, said collar presenting in its flaring part a curved annulus which is inserted between two curved members or laminae, the three elements being resiliently pressed against each other when the joint is assembled by reason of slight differences in the camber of one or more of them and because of the resilient characteristics of the sheet metal or other material employed.

The invention may be embodied in a variety of constructural forms. For example, the two curved members or laminae between which the collar is inserted may extend outwardly toward one another and each terminate in a flat rim portion by means of which these members may be secured to one another or to another element of the assembly. It is advantageous to have these flat rim portions arranged in a plane perpendicularly to the axis of the pipe and its flange or collar when all the members in assembly are arranged symmetrically.

This solution is also particularly advisable when the joint or coupling is to be established between a pipe and a flange defining the outlet from an engine exhaust port or similar opening and the flange is attached to a cylinder head or an intervening plate in a position normal to the axis of the pipe. In this case the laminae are with advantage fixed by means of their flat rim parts to a flat surface of the engine body or to the intervening plate by bolts passing through suitable openings (not shown) in the plate.

When the invention is used to introduce a certain lateral deformability into a pipe, it offers a very advantageous embodiment requiring little space, e. g., in the case of an intermediate joint joining two pipe sections. Each of the opposed ends of the pipes that are to be coupled together is provided with an outwardly flaring collar with its flaring portion enclosed between two laminae as defined, and the two groups of laminae are placed with their flat outer rim portions side by side. In another embodiment of the invention the two inner opposite laminae are formed as a single member.

It is very important to note that as the centers of the bearing surfaces of the two systems of laminae are arranged at both sides of the assembly, the latter has liberty of movement in two directions and not only one as in the case of an ordinary swivel, which however takes up much more space. The inclination of the joints with respect to the pipes permits their being staggered parallelly to each other, while they may also make a small angle to one another. The system thus is equal to two swivels combined, with an intermediate rectilinear portion.

It will likewise be observed that the fluids in order to escape must describe a zigzag path between the three members that are in contact by means of their arcuate bearing surfaces. It will be clear that without departing from the scope of the invention it is possible to combine with the members described sliding parts intended to compensate for the longitudinal displacements such as those that may result particularly from the effects of expansion.

Any material and method suitable for the invention may obviously be used for the members described above, but electric spot welding is particularly applicable in reducing the invention to practice. Moreover, the making of the blanks is particularly easy from suitable stamped pieces.

Referring to Figures 1 and 2 the pipe joined to the flange is shown at 1. The collar integral (as by welding) with the end of the pipe 1, is seen at 2. 3 is the outer lamina, 4 the lamina inside of the collar 2. A stamped annular member 5 provided with a flange 5a secures the continuity of the passage offered to the fluid in the interior of the flange, 6 is a thick plate receiving the bolts attaching the flange to the cylinder or other supporting member 7. The center of the arcuate bearing surfaces of the laminae and the collar is shown at 0. 10 is one of the holes in the flange for assembly by bolts to fix it and the plate 6 onto the supporting member 7. 9 indicates electrically welded spots connecting the members 3, 4 and 5 together. Optionally the welds may also extend to and join the plate 6 with the other members in an integral whole.

In Figures 3 and 4, 11 and 11a are the pipes to be joined, 12 and 12a the outwardly flaring collars belonging to them, 13 and 13a the outer laminae for said collars, the two inner laminae being formed by a single annular member 14 shaped to have an ovate cross section. The centers of the arcuate bearing surfaces of said laminae are shown at 15 and 15a. The members 13 and 13a are shown as joined together by spot welds 16 at spaced intervals along their juxtaposed flat rim portions. It is clear that if the joint is to be dismountable, these welds may be replaced by bolt holes or the like.

To ensure the continuity of the passage and minimize turbulence in the flow of the fluid passing through the pipe in the embodiment shown in Figure 3, the pipes extend as at 17 beyond the points of attachment of their collars 12 and 12a. In this manner the space 18 comprised between the ends of the pipes 11 and 11a is reduced as much as possible, taking into account the relative displacements the joint must admit of.

Figure 5 shows an application of the invention in the case of a flange or joint assembly which must be subject to a sliding motion along the axis of the opening to which the pipe is connected. The joint assembly includes a flanged plate 6 and an additional flange member 21. The cylindrical extension of the collar 12 engages between the annular space between the cylindrical part of the member 21 and a cylindrical and concentric extension 21a of the flange 6. The joint is provided with members 13 and 13a, 12 and 12a similarly as shown in the embodiment of Figure 3, except that the member 12 is not attached to the tubular extension 21a but rather has a sliding fit between 21a and the corresponding tubular extensions of the flange member 21. Also, the central piece 14 is replaced in Figure 5 by a member 19 cut away to form recesses 20 and having a leg 19a which is gripped between the flat rim portions of members 13 and 13a, these several members being secured together by welding or bolts, not shown.

Figure 6 is an example of an application of the invention to a manifold with three branches fixed by means of three flanges 6a, 6b, 6c on an engine or other support having three openings. This is the case, for example, of an exhaust manifold with three adjacent cylinders. In such a case it happens that on account of the different temperatures of the manifold and the member to which it is secured by means of the flanges, the distances between the axes of the flanges connected to the head and the extensions of the manifold such as 22, 23 and 24 opposite said flanges will vary.

In the case of Figure 6 it has been assumed that the manifold is rigidly connected to the head by means of the central flange 6b. The result is that the axis 21b of branch 23 remains more or less invariable opposite the axis 20b of the head. The two end branches 22 and 24 are fixed to the head by means of joints analogous to the one shown in Figure 5. Owing to the sliding motion and the possible inclination of the members 19a and 19c all the differences of expansion are compensated for and all constraints or risks of corresponding rupture are eliminated by the application of the invention.

Having now fully described my invention, I claim:

1. A labyrinth joint or flange for connecting a pipe to another member, comprising a collar having one end integrally secured to an extremity of the pipe and having the other end flared outwardly to form an arcuate annulus, and a pair of members spaced apart from each other at one of their ends to receive said annulus between them, said spaced members being curved at slightly different angles to one another so as to grip said annulus resiliently, said members having their opposite ends integrally connected together, and a support rigidly secured to the integrally connected ends of said members, and having a cylindrical flange extending towards the extremity of said pipe.

2. A labyrinth joint or flange for connecting together two pipes in end-to-end relation, comprising a collar rigidly secured exteriorly upon and near to but spaced from the extremity of one of said two pipes, a second collar similarly secured exteriorly upon and adjacent the extremity of the other of said pipes, each of said collars having an outwardly flaring arcuately curved flange, of sufficient width when brought into engagement to slightly space apart the ends of the pipes, and a pair of outer members integrally connected together near their peripheries and each having curved portions extending respectively over and in contact with the exterior surface of one of said arcuately curved flanges.

3. A labyrinth joint or flange for connecting a pipe to another member, comprising an annular plate secured to said other member and having a cylindrical flange extending towards said pipe, another plate secured to said first-mentioned plate and having a cylindrical flange spaced from the first-mentioned cylindrical flange to provide an annular space therebetween, a cylindrical collar located in said annular space and slidably gripped by said flanges, said collar having an outwardly flaring portion forming an arcuately curved annulus, a second collar integrally secured to the extremity of said pipe and having an outwardly flaring portion forming an arcuately curved annulus, a pair of outer members integrally connected together near their peripheries and each having curved portions extending respectively over and in contact with one of said arcuately curved flanges, and an inner member having a curved surface extending under and in contact with said arcuately curved flanges, each of said arcuately curved flanges and said inner and outer members cooperating resiliently to grip said flanges between them.

4. A labyrinth joint or flange as in claim 3 wherein the inner member has an outwardly extending leg or stem located between and rigidly secured to the peripheral portions of the said outer members.

5. A labyrinth joint or coupling for connecting a pipe to another member in a line adapted to transmit engine exhaust gases and other high temperature fluids, comprising a collar having one end integrally secured to the pipe adjacent one end thereof and having the other end flared outwardly to form an arcuate annulus, a pair of metallic members each having a resilient annular portion arcuate in cross section, said annular portions being arranged in concentric relation and receiving the arcuate flaring end of said annulus between them in a resilient gripping relation, and at least the outer of said pair of members having the outer rim portion thereof extending substantially at right angles to the longitudinal axis of said pipe and secured to a supporting member.

6. A labyrinth joint or coupling for connecting a pipe to another member in a line adapted to transmit engine exhaust gases and other high temperature fluids, comprising a collar having a cylindrical portion associated with said member adjacent an orifice therein and having an outwardly flaring portion forming an arcuately curved annulus, a second collar integrally secured adjacent the end of said pipe and having an outwardly flaring portion forming an arcuately curved annulus, a pair of outer annular members each having an arcuately curved portion extending over and in contact with one of said arcuately curved outwardly flaring collar annuli, said outer members having outer annular rim portions secured in fixed relation adjacent one another, and an inner member having an arcuately curved surface extending under and in contact with each of said arcuately curved outwardly flaring collar annuli, said inner and outer members cooperating resiliently to grip said arcuately curved outwardly flaring collar annuli between them.

PIERRE ERNEST MERCIER.